July 8, 1969   H. E. CIER   3,454,665
SOLUTION DIMERIZATION
Original Filed April 15, 1964
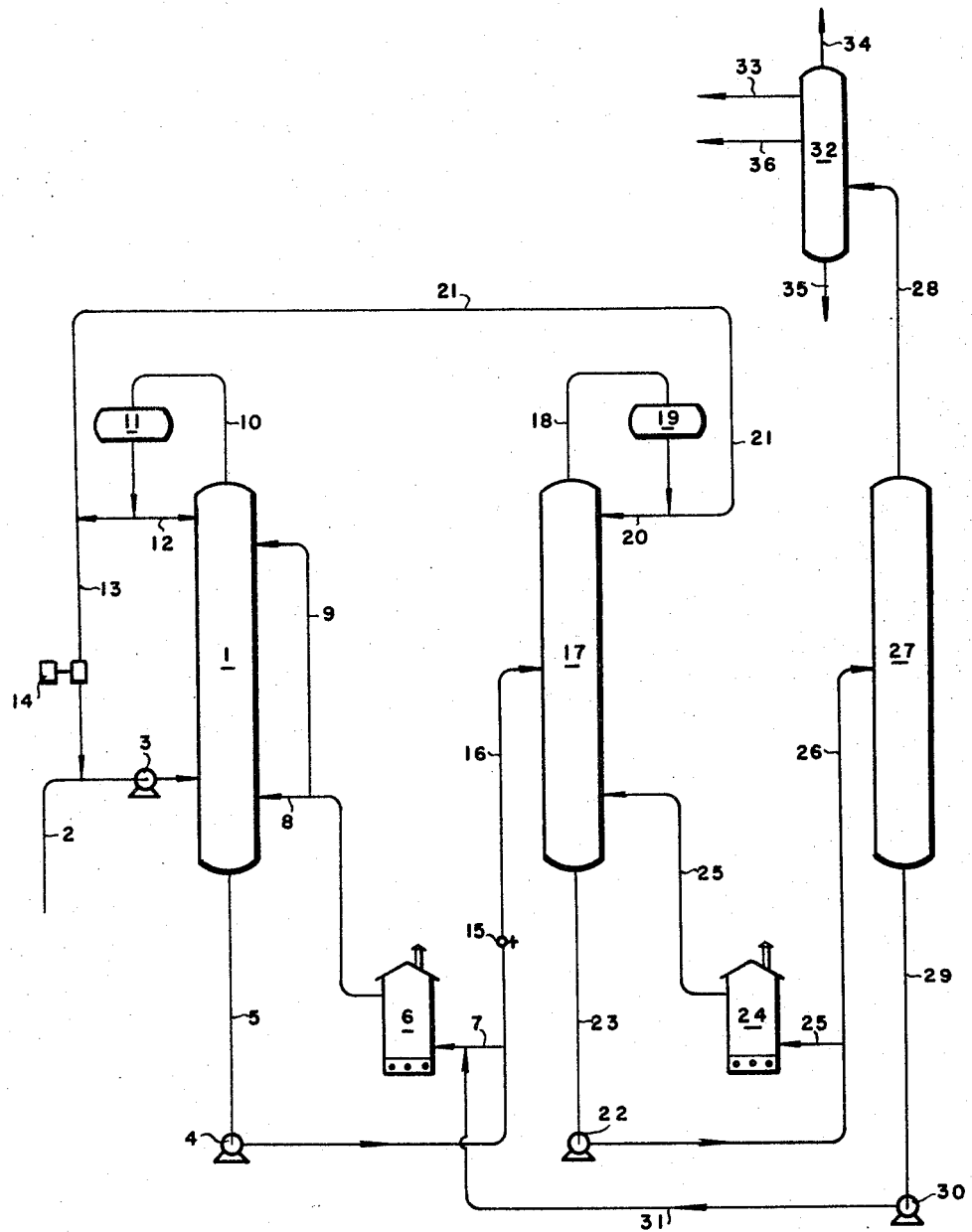
INVENTOR.
HARRY E. CIER,
BY
ATTORNEY.

United States Patent Office 3,454,665
Patented July 8, 1969

3,454,665
SOLUTION DIMERIZATION
Harry E. Cier, Baytown, Tex., assignor, by mesne assignments, to Esso Research and Engineering Company, Elizabeth, N.J., a corporation of Delaware
Continuation of application Ser. No. 359,914, Apr. 15, 1964. This application Nov. 16, 1966, Ser. No. 596,718
Int. Cl. C07c 13/20, 3/60
U.S. Cl. 260—666                                  5 Claims

ABSTRACT OF THE DISCLOSURE

In a process for continuously dimerizing conjugated dienes, a continuous solution dimerization process is used which comprises introducing an inert liquid solvent into the top of a gas-liquid reaction zone and introducing the conjugated diene countercurrently to the inert liquid solvent, the diene passing countercurrently as a gas, and recovering the dimer in the liquid solvent.

---

The present invention is directed to an improved process for the dimerization of conjugated dienes. More specifically, the invention is concerned with a continuous countercurrent process for the selective formation of dimers of conjugated dienes having 4 to 6 carbon atoms per molecule. In one of its more specific aspects, the present invention is directed to a continuous process for producing vinylcyclohexene by dimerizing 1,3-butadiene by passing the 1,3-butadiene as a gas countercurrently to an inert liquid solvent through a reaction zone.

This application is a continuation of Ser. No. 359,914 filed on Apr. 15, 1964 which is now abandoned.

The present invention may be briefly described as a continuous solution dimerization process for producing dimers by the Diels-Alder reaction which comprises continuously introducing a conjugated diene having 4 to 6 carbon atoms per molecule either alone to form the dimer of the diene or together with a compound containing an ethylenic linkage which combines with the conjugated diene by a 1,4-addition into a gas-liquid reaction zone maintained at a temperature and pressure such that the diene is a gas in the reaction zone countercurrently to an inert liquid solvent.

The Diels-Alder reaction is a non-catalytic reaction, but it is highly temperature dependent. Thus, products formed by the Diels-Alder reaction heretofore have been produced by a conventional process which involves a vapor phase reaction under super-atmospheric pressure. Elevated temperatures are normally employed often using temperatures above the critical temperature of the diene. It has been found, according to the present invention, that improved reactivity can be obtained in the formation of products by the Diels-Alder reaction by the continuous solution dimerization process of the present invention.

The continuous solution dimerization process of the present invention may be characterized to distinguish it from other dimerization processes by having all of the following characteristics:

(1) The process is continuous in nature;
(2) The reaction conditions of temperature and pressure are such that the conjugated diene is gaseous;
(3) An inert liquid solvent is employed in the reaction zone;
(4) The reaction vessel is one designed for gas-liquid contacting, as for example, a gas absorption tower or a distillation column;
(5) The gaseous conjugated diene and inert liquid solvent are passed countercurrently through the reaction zone;
(6) The highest concentration of conjugated diene commensurate with the operating temperatures and pressures may be at all times maintained in the solution in the reaction zone;
(7) The reaction conditions of temperature and pressure may be maintained substantially at the optimum for the specific equipment throughout the dimerization reaction;
(8) Uniform withdrawal of product at a rate equivalent to its production is accomplished; and
(9) High selectivity of the desired product is achieved. Conversely, low selectivities to trimer and heavier polymers of the conjugated diene are obtained.

Another feature of the present invention is that appropriate recycle streams insure complete utilization of all the conjugated diene.

It is an object of the present invention to provide a continuous solution dimerization process having the characteristics and features listed above.

Another object is to provide a dimerization process having improved reactivity.

Still further objects will become apparent from the following description.

In the practice of the present invention products are formed according to the Diels-Alder reaction. Thus, conjugated dienes such as 1,3-butadienes, piperylene, isoprene, cyclopentadiene and the like are selectively dimerized without the use of a polymerization catalyst, and further, in accordance with the present invention, without the formation of significant amounts of the undesirable higher polymers. It is also possible, according to the present invention, to dimerize the conjugated dienes with compounds containing an ethylenic linkage, such as ethylene, propylene, maleic anhydride and the like, to selectively form products which heretofore were produced by laborious or inefficient laboratory scale procedures. The present invention will be illustrated by the dimerization of 1,3-butadiene to form vinylcyclohexene and the dimerization of ethylene and 1,3-butadiene to form cyclohexene.

The continuous solution dimerization process of the present invention is carried out in a gas-liquid reaction vessel. The reaction vessel may be a common gas absorption tower or a distillation column. In any event, the reaction vessel is provided with gas-liquid contacting means to provide maximum gas and liquid contact. The conjugated diene or a mixture of the conjugated diene and a compound having an ethylenic linkage is introduced at the bottom of the reaction vessel either as a liquid or a gas. The reaction conditions of temperature and pressure are maintained at as near the maximum as is possible for the reaction vessel used to obtain the most beneficial reactivity. Thus, in a sense, the upper limit for the reaction conditions according to the solution dimerization process of the present invention is the equipment used. On the other hand, no specially designed equipment is necessary to carry out the dimerization process of the present invention. The reaction conditions must be, however, such that the conjugated diene is a gas in the reaction zone. The reaction conditions may be selected from pressures within the range of about 100 to about 500 p.s.i.g. and temperatures within the range of about 200° to about 500° F. Preferably, the reaction conditions, especially for the dimerization of 1,3-butadiene, are within the range of about 250 to about 450 p.s.i.g. and within the range of about 350° to about 450° F.

An inert liquid solvent is introduced into the top of the reaction vessel and passes countercurrently to the conjugated diene. There are two requirements which are necessary for the inert liquid solvent and they are:

(1) The solvent is nonreactive under the conditions employed; i.e., it will not react with the conjugated diene or with the products formed in the dimerization.

(2) The solvent must be easily separable from both the reactants and the products.

Inert liquid solvents suitable in the solution dimerization process of the present invention are hydrocarbons having a boiling point at least about 15° F. in excess of the boiling point of the desired product to be obtained in the dimerization reaction. The inert solvents found to be most effective are substantially free of aromatics. Thus, as an illustration, in the dimerization of 1,3-butadiene where the desired product is 4-vinylcyclohexene, the solvent should have a boiling point of at least 280° F. so that an easy separation may be obtained to recover the desired 4-vinylcyclohexene. It is desirable and preferred, however, that the boiling point of the solvent be substantially in excess of the boiling point of the desired dimer product. Hence, solvents having boiling points of about 400° to about 500° F. are preferred in the dimerization of 1,3-butadiene. A particularly suitable inert liquid solvent in the manufacture of 4-vinylcyclohexene is a substantially paraffinic wash oil having a boiling point of about 420° F.

In the practice of the present invention, it is preferred that excess diene is introduced at the bottom of the reaction vessel in order that a small amount of unreacted gaseous diene comes overhead. The use of excess diene insures that the maximum concentration of diene is in solution under the selected reaction conditions. As the dimerization reaction occurs, the desired dimer becomes a part of the solution. The resulting dimer product is thus removed continuously with the inert solvent from the bottom of the reaction vessel.

According to the present invention, the reaction conditions may be selected for optimum results by maintaining the pressure and temperature within limited limits. This aspect of the present invention is achieved by having the regulation of the pressure and temperature independent of the reaction rate and concentration of diene in the reaction zone. Heretofore, the batch dimerization process of conjugated dienes, especially in the liquid phase, has been unsuccessful since the operating conditions have varied considerably through the reaction. As a result, the rate of reaction changed throughout the process as the diones dimerized or the temperature and pressure changed which prevented any substantial control of the dimerization reaction.

It has been found, according to the present invention, that a continuous solution dimerization process for conjugated dienes is achieved wherein the pressure and temperature conditions are substantially maintained to selectively obtain the desired dimer.

The invention will be further illustrated with respect to the accompanying drawing wherein:

FIG. 1 is a preferred mode illustrating the process of the present invention.

Referring to the drawing, the continuous solution dimerization of the present invention may be carried out in a gas-liquid contacting zone such as a distillation column 1. The distillation column is provided with its usual multiple trays or other equivalent gas-liquid contacting means. Rather than a distillation column, other equivalent gas-liquid contacting vessels may be used, such as a column of the packed-bed type. To begin the operation the distillation column 1 is filled about half full with an inert solvent introduced through line 2 by pump 3. The solvent is circulated by a pump-around system comprising a pump 4 which removes liquid through line 5 from the bottom of distillation column 1 and pumps the liquid to the furnace 6 through line 7 to heat the liquid to the desired operating temperature. The heated solvent is then reintroduced into distillation column 1 by lines 8 and 9. After the inert solvent has been heated so that the dimerization zone has been heated to the desired operating conditions, the conjugated diene, for example, 1,3-butadiene, is introduced through line 2 by pump 3 into the bottom of distillation column 1. Sufficient diene is introduced so that an excess will pass countercurrently to the inert solvent through the distillation column 1, and gaseous diene will be removed from the top by line 10. The distillation column 1 is maintained at the desired operating pressure by controlling the removal of unreacted diene. Suitable condensing means 11 may be provided and if condensing means are used, a portion of the condensed diene is reintroduced by line 12 into distillation column 1; whereas, the remainder is recirculated by line 13 for introduction with the fresh feed diene. If the condensing means 11 are not used or if ethylene and 1,3-butadiene are being dimerized, the gaseous overhead is recirculated by line 13 to compressor 14 for introduction with the fresh feed. While the diene is introduced preferably into the bottom of distillation column 1 as a liquid, it is to be noted that the reaction conditions in distillation column 1 are such that the diene passes through as a gas countercurrently to the inert solvent introduced by line 9.

After the initial start-up operations have been completed and the dimerization reaction occurs in distillation column 1, a portion of the bottoms from distillation column 1 comprising the dimer, the inert solvent and other dimerization products is passed by opening valve 15 through line 5 and line 16 to a stripper column 17. In stripper column 17, unreacted diene is removed overhead by line 18. Suitable condensing means 19 are provided for condensing the overhead, and a portion of the condensate is reintroduced into stripper column 17 by line 20. The remainder of the condensate is recirculated by line 21 which is passed into line 13 and through compressor 14 if gas is present in the condensate or by a pump if a liquid to be reintroduced into distillation column 1. The conditions in stripper column 17 are maintained at an overhead temperature at the boiling point of the diene by providing the stripper column 17 with a pump-around system consisting of a pump 22 which pumps the bottoms material through line 23 and into furnace 24 by line 25. The remaining bottoms material from stripper column 17 is pumped through line 26 to a second distillation column 27. In distillation column 27 the desired dimer, e.g., 4-vinylcyclohexene or cyclohexene, is removed overhead by line 28 and is separated from the inert solvent which is removed by line 29. The inert solvent may be recirculated by pump 30 through line 31 to be introduced into line 7 and heated by furnace 6 before introducing into distillation column 1.

The desired dimer product may be further purified by introducing it into a fractional distillation zone 32 whereby the desired dimer, e.g., 4-vinylcyclohexene or cyclohexene, is recovered by line 33, and light boiling materials passed overhead through line 34. Any heavy materials are removed by line 35. It was found in the dimerization of butadiene by the continuous solution process of the present invention that a small amount of 1,5-cyclooctadiene may be recovered, and it may be recovered from the fractional distillation zone 32 by line 36.

The present invention is further illustrated by the following example which is considered as an illustration of the present invention and not as a limitation thereto.

Two fractionators stacked so as to provide the equivalent of a 120-tray distillation tower were used as the liquid-vapor contacting zone for the dimerization of 1,3-butadiene. The equipment was arranged essentially as set forth in FIG. 1 except the dimer was not separated from the solvent and the solvent was not recycled. The inert solvent was a paraffinic wash oil having a boiling point of 420° F. The desired reaction conditions were about 400° F. and 300 p.s.i.g., but while the desired temperature was obtained, the desired pressure was never reached. The operating pressure varied from 135 to 180 p.s.i.g. This lower than desired pressure was a result of a much higher than expected reactivity of the butadiene. The butadiene reacted so rapidly that the feed system could not charge fresh butadiene rapidly enough to maintain the desired pressure. The product obtained from the bottom of the stripper column had the following analysis:

TABLE I

| Component: | Liquid, volume percent |
|---|---|
| Butadiene | 9.8 |
| Vinylcyclohexene | 27.1 |
| Cyclooctadiene | 1.7 |
| Inert solvent [1] | 61.4 |

[1] By difference.

This product was then subjected to a laboratory distillation of which the following analysis was obtained:

TABLE II.—ANALYSIS OF FRACTIONS FROM LABORATORY DISTILLATION

| Cut No. | Temp., °F. | Volume, percent | Butadiene | Light polymer | 4-vinylcyclo-hexene-1 | 1,5-cyclo-octadiene | Heavy material |
|---|---|---|---|---|---|---|---|
| 1 [1] | 50 | 9.38 | | | | | |
| 2 | 262 | 1.0 | 23.1 | 28.3 | 48.6 | | |
| 3 | 264 | 1.0 | 4.4 | 7.7 | 87.9 | | |
| 4 | 265 | 1.0 | 2.0 | 2.4 | 95.6 | | |
| 5 | 265 | 21.75 | | | [2] 99.27 | | |
| 6 | 272 | 1.0 | | | 94.7 | 5.3 | |
| 7 | 286 | 1.0 | | | 80.8 | 17.7 | |
| 8 | 304 | 1.0 | | | 44.7 | 46.6 | 7.1 |
| 9 | 316 | 1.0 | | | 18.0 | 56.8 | 25.2 |
| 10 | 337 | 1.0 | | | 7.1 | 45.0 | 47.9 |
| 11 | 356 | 1.0 | | | 2.9 | 23.8 | 73.3 |
| 12 | 369 | 1.0 | | | 1.1 | 7.3 | 91.6 |
| 13 | 377 | 1.0 | | | 0.7 | 1.8 | 97.5 |

[1] Not analyzed. Essentially pure butadiene.
[2] Total impurities by trace method is 0.73%.

The analysis of the essentially pure vinylcyclohexene established that a light impurity of 0.73% by volume was present, whereas the heavy impurity was nil. It can be determined from the foregoing data that a high purity dimer may be produced in an easy manner according to the continuous solution dimerization process of the present invention.

The advantages of the present invention wherein a continuous solution process for the selective dimerization of conjugated dienes is utilized may be best pointed out by comparing it with dimerization processes which have been previously used. The following data are based on a calculated rate constant obtained from laboratory and experimental data. Considering the preferred temperature range according to the present invention and at a selected pressure, the decided advantage in reactivities for the solution dimerization is indicated in Table III.

TABLE III.—BUTADIENE CONVERSION AT 300 P.S.I.G. TO VINYLCYCLOHEXENE EXPRESSED AS LBS./HR./100 BBLS. REACTION VOLUME

| Reactor Temp., °F. | Solution dimerization | Vapor phase dimerization |
|---|---|---|
| 375 | 1,275 | 175 |
| 400 | 1,750 | 350 |
| 425 | 2,250 | 650 |

When the continuous solution dimerization process is compared with the usual batch liquid phase process, the reactivity in the continuous solution dimerization process remains essentially constant, whereas in the batch liquid phase process, the reactivity will fall with time very rapidly.

It is again emphasized that one of the aspects of the present invention is to maximize the desired dimer in the dimerization reaction after the reaction conditions have been set, either by equipment limitations or by choice. Once having set the reaction conditions, these conditions, according to the process of the present invention, may be maintained so as to maximize the desired product. As set forth in the data of Table IV, maximum temperatures and pressures are desired.

TABLE VI.—CONTINUOUS SOLUTION DIMERIZATION OF BUTADIENE IN 420° B.P. SOLVENT EXPRESSED AS LBS./HR./100 BBLS. REACTION VOLUME

| P.s.i.a. | 350° F. | 425° F. | 500° F. |
|---|---|---|---|
| 200 | 250 | 1,050 | 2,150 |
| 300 | 950 | 2,100 | 4,100 |
| 400 | 1,150 | 3,300 | 6,100 |
| 500 | 1,950 | 5,150 | 9,050 |

The nature and objects of the present invention having been completely described and illustrated and the best mode thereof set forth, what I wish to claim as new and useful and secure by Letters Patent is:

1. A continuous solution dimerization process which comprises continuously introducing an inert liquid solvent into the top of a gas-liquid reaction zone which is substantially maintained at a selected pressure and temperature within the range of 100 to about 500 p.s.i.g. and within the range of about 200° to 500° F., continuously introducing a conjugated diene having 4 to 6 carbon atoms per molecule countercurrently to said inert liquid solvent, said diene passing countercurrently as a gas, and recovering the desired dimer from said liquid solvent.

2. A process according to claim 1 wherein said diene is 1,3-butadiene, and 4-vinylcyclohexene is recovered from said solvent.

3. A process according to claim 1 wherein said liquid solvent has a boiling point at least 15° F. in excess of the desired dimer.

4. A process according to claim 3 wherein said diene is 1,3-butadiene, and 4-vinylcyclohexene is recovered from said solvent by simple distillation.

5. A process according to claim 2 wherein said gas-liquid reaction zone is substantially maintained within the range of about 250 and 450 p.s.i.g. and within the range of about 350° and 450° F.

References Cited

UNITED STATES PATENTS 2,411,822  11/1946  Doumani _____ 260—666
2,662,102  12/1953  Whitman _____ 260—666

OTHER REFERENCES

Chemical Engineers Handbook, John H. Perry, McGraw-Hill, New York, 4th Ed., p. 18–3, 1963.

DELBERT E. GANTZ, *Primary Examiner.*

V. O'KEEFE, *Assistant Examiner.*